Feb. 11, 1947.                H. A. MACDONALD                2,415,490
FLOAT
Filed Nov. 26, 1943
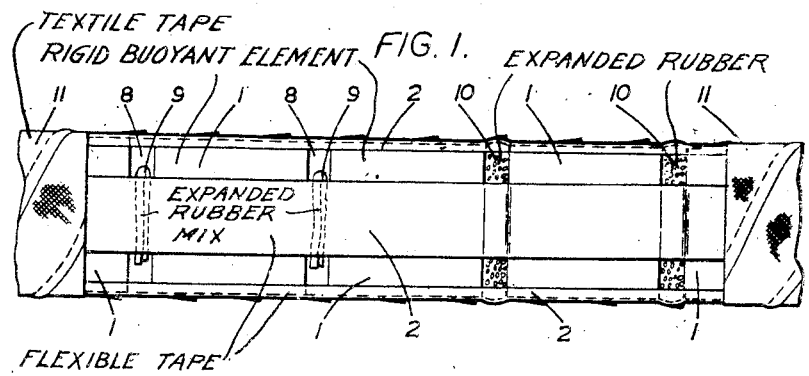
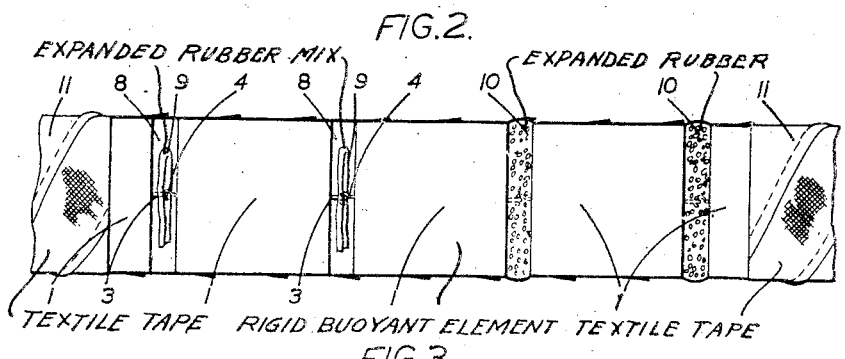
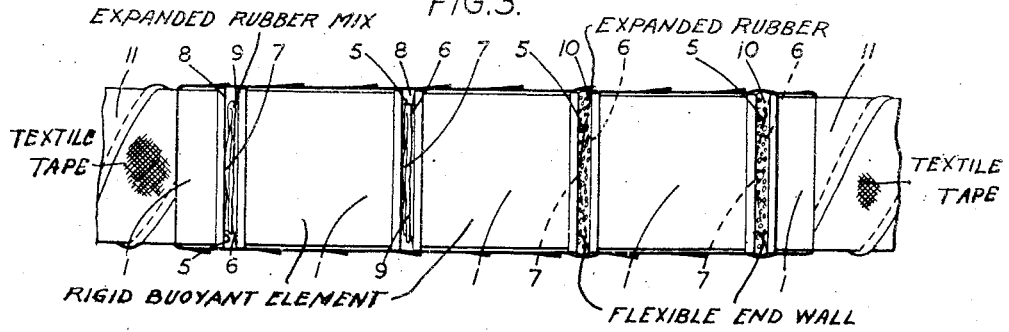
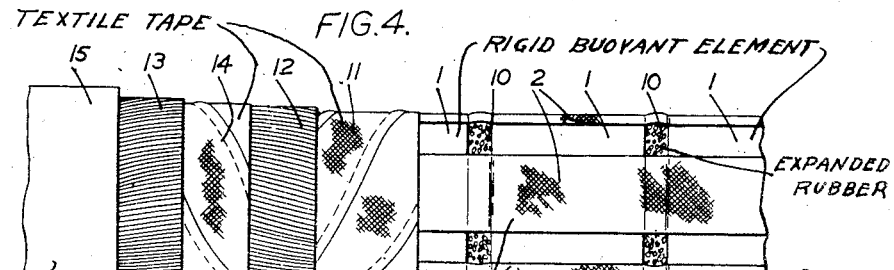
Inventor:
Hector Atherton Macdonald,
By
Stebbins, Blenko & Webb,
Attorneys.

Patented Feb. 11, 1947

2,415,490

UNITED STATES PATENT OFFICE 2,415,490

FLOAT

Hector Atherton Macdonald, Gravesend, Kent, England, assignor to W. T. Henley's Telegraph Works Company Limited, Westcott, Dorking, England, a British company Application November 26, 1943, Serial No. 511,873
In Great Britain December 15, 1942

8 Claims. (Cl. 9—8)

This invention relates to the production of long flexible floats for use as cores in the manufacture of water-buoyant electric cables or for supporting in water wires, ropes, drift nets or other articles of greater density than water. To perform such functions, it is obvious that the average density of the composite article comprising the flexible float and the supported matter must be less than the density of water. The cross-sectional dimensions of the float are thus governed by its density, which should be as low as is practicable, and by the size and density of the matter which it is to support. More particularly is the invention concerned with low density floats of the kind which are built up of a number of rigid buoyancy elements, which may have the form of closed hollow containers, for instance, sheet metal containers, or bodies of cellular material, for instance, wood or cork, between some or all of which rigid elements flexible resilient members are interposed. The presence of the flexible resilient members permits the float to have the necessary flexibility.

Such floats will usually have an outer water-excluding covering for the purpose of giving protection to the float itself or imparting a smooth continuous surface thereto or, where the float forms the core of a cable (having a conductor constituted by a number of wires laid helically around the core), for the purposes of insulating and giving mechanical protection to the conductor. Whilst this covering remains sound, the spaces between the ends of the rigid elements serve to increase the buoyancy of the float. With the object of avoiding a serious reduction in buoyancy should the outer covering become damaged so that water may leak through it, without substantially reducing the initial buoyancy of the float, the resilient members between the rigid elements are made of low density material and of such a size that, initially at least, they fill the hollow space between two successive rigid elements and the surrounding covering.

In accordance with the present invention, adequate flexibility is achieved and the maintenance of a high degree of buoyancy is ensured by the combination of means for determining or limiting the distance apart of the rigid elements and the use of expanded rubber resilient members which are expanded in position between the rigid elements, so that they take the shape and dimensions of the otherwise vacant space there and fill it. By the term "expanded rubber" is meant a cellular mass of vulcanised rubber having non-intercommunicating cells, and by the term "expanded rubber mix", to be used hereinafter, is meant an unvulcanised rubber mix from which expanded rubber is obtainable by subjecting it to an appropriate heat treatment, whether it be a mix containing special ingredients, for instance, a mix containing appropriate amounts of accelerator and an organic material such as diazoamino benzene, capable of dissolving in the mix and decomposing on heating with evolution of gas, or a mix which has been pre-treated in some special manner, for instance, by introducing inert gases under pressure. The term "rubber" used herein is applicable not only to natural rubber, but also the synthetic rubbers which are applicable to the purposes indicated herein.

The invention will be further described with the aid of the accompanying drawing to which frequent reference will be made. In the drawing—

Figure 1 is a fragmental view partly in section and partly in elevation of one form of construction of flexible float embodying the invention, Figures 2 and 3 are fragmental views partly in section and partly in elevation of alternative forms of construction of float embodying the invention, and Figure 4 shows an example of a buoyant electric cable having as a core a float of the form shown in Figure 1, parts of the cable having been cut away to expose its construction.

The means for determining or limiting the distance apart of the rigid buoyancy elements, indicated in the drawing by the numeral 1, may consist of connections, either applied between the ends of these members, or along the outside of them. Examples of the latter are shown in Figure 1. They consist of flexible tapes 2 running longitudinally over the outside surfaces of the rigid elements 1 and made to adhere to each one of them. Examples of the former are shown in Figure 2, and consist of short links of articulated form placed at or about the axis of the core. They may, as shown in Figure 2 comprise a hook member 3, secured to the centre of one end wall of one rigid element, which engages an eye 4, secured to the centre of the neighbouring wall of the next rigid element. Alternatively, a link of flexible form may be employed. In place of an articulated connection there may be a rigid connection between the contiguous ends of successive rigid members, one or both of which ends possess sufficient flexibility to permit of the required angular displacement of the elements. Examples of such connections are shown in Figure 3, where the elements 1 are in the form of thin-walled metal containers, each having one end wall 5 that is flat and sufficiently flexible and one 6 that is relatively inflexible, it being in the form of a shallow cone with a flattened apex 7. These containers are placed end to end with the conical end wall of one to the flat end wall of the next and are secured together by soldering at the centres.

The connection of the rigid buoyancy elements 1 in line is advantageous in itself in that it facilitates the handling of a line of elements before it is incorporated in a cable or before a sheath is applied. By the present invention it is made additionally advantageous in that it limits the spacing of the elements and facilitates the complete filling of the spaces 8 by low density material.

The filling is done by inserting one or more pieces 9 of an expanded rubber mix into each space 8 between the rigid elements as shown, for example, on the left of Figures 1, 2 and 3, and, at some later stage, heating the mix. This heating produces the combined effects of toughening by vulcanisation and liberation of gas within the mix so as to impart a cellular structure thereto and expand it to fill the spaces, whereupon it becomes a water-impervious, low density, filling 10 of expanded rubber, as shown on the right of Figures 1, 2 and 3 and in Figure 4. A specific gravity of the order of 0.2 may be obtained, but a specific gravity of between 0.3 and 0.4 is preferred as it is more easily obtainable and is sufficiently low for most purposes.

The insertion of the expanded rubber mix preferably takes place after the rigid elements have been connected to form a line and the heating is preferably done as the final operation in the manufacture, for instance, in the case of a buoyant cable, after the conductor and outer covering have been applied. This heating can then serve to vulcanise the outer cover as well as to vulcanise and expand the inserted pieces of expanded rubber mix.

In the manufacture of the improved flexible float, whether or not it is intended for use as a core for a buoyant cable, it will generally be advantageous to place a lapping of textile tape directly over the line of rigid elements. This tape, which is shown at 11 in all the illustrated examples, forms a circumferential closure wall for each space 8 and together with the end walls of the elements forms a series of closed moulds for the expanded rubber mix. The filling of the space between successive rigid elements can then be ensured and the resilient filling of expanded rubber may have some excess internal pressure forcing the filling outwards against the tape lapping. This is advantageous in that it provides the possibility of maintaining a filled space, even after some leakage of the internal gas. In the manufacture of a buoyant cable embodying the invention, the provision of the tape lapping 11 is not essential, but is advisable in that it forms a bedding for the conductor wires or for an inner layer of wires where, as shown in Figure 4, there are two layers 12 and 13 of such wires separated by a fabric layer 14 and enclosed in a tough rubber sheath 15, and prevents escape of the expanding rubber between the wires and hence a reduction of the excess internal pressure, which pressure, as has been indicated above, is advantageous.

It will be understood that the example of buoyant cable shown in Figure 4 of the drawing may be built up around a core of the form shown in Figure 2 or that shown in Figure 3, instead of around a core of the form shown in Figure 1.

What I claim as my invention is:

1. A long flexible float comprising a number of rigid buoyancy elements disposed end to end, means for limiting the distance apart of at least some of the rigid elements to provide limited spaces therebetween, and means for filling the said limited spaces consisting of resilient expanded rubber expanded in position and moulded to the ends of the rigid elements.

2. A long flexible float comprising a number of rigid buoyancy elements disposed end to end, means comprising longitudinally extending tapes adhering to the outer surfaces of said elements for holding said elements together and limiting the spaces between successive elements, and means for filling the spaces between said elements comprising resilient expanded rubber expanded in position and moulded to the ends of said elements.

3. A long flexible float comprising a number of rigid buoyancy elements disposed end to end and coupled together along the axis of the float to provide limited spaces therebetween, and means for filling the limited spaces consisting of resilient expanded rubber expanded in position and moulded to the ends of the said elements.

4. A long flexible float comprising a number of rigid buoyancy elements, each having a pair of end walls of which at least one is flexible and one convex outwards, disposed end to end so that at least one end wall of each two neighbouring end walls is a flexible wall, means for coupling the centre of the flexible end wall of each element directly to the centre of the end wall of the next element, and means for filling the limited spaces between successive directly coupled elements consisting of resilient expanded rubber expanded in position and moulded to the coupled end walls of the said elements.

5. A long flexible float comprising a number of rigid buoyancy elements disposed end to end, means comprising articulated links for coupling said elements together along the axis of the float, whereby to provide limited spaces between successive elements, and resilient expanded rubber filling the limited spaces between the coupled elements, said rubber being expanded in position and moulded to the ends of the said elements.

6. A long flexible float comprising a number of rigid buoyancy elements disposed end to end, means comprising flexible links for coupling said elements together along the axis of the float, whereby to provide limited spaces between successive elements, and resilient expanded rubber filling the limited spaces between the coupled elements, said rubber being expanded in position and moulded to the ends of the said elements.

7. A long flexible float comprising a number of rigid buoyancy elements disposed end to end, means for limiting the distance apart of at least some of said elements to provide limited spaces therebetween a helical lapping of textile tape forming a covering for said rigid elements and a closure wall for spaces between successive rigid elements, and resilient expanded rubber filling said spaces, said rubber being expanded in position and moulded to the end walls of the rigid element and to the textile tape covering.

8. A method of making a long flexible float which comprises forming a line of rigid buoyancy elements by disposing said elements end to end and connecting them together to limit their distance apart, inserting pieces of expanded rubber mix in the limited spaces between said rigid elements, applying textile tape to the line of connected elements to form a continuous covering therefor, and thereafter heat-treating the assembly to liberate gas within the rubber mix insertions and thereby expand and vulcanise the insertions and convert them into resilient, water-impervious, low-density fillings of expanded rubber which fill the inter-element spaces.

HECTOR ATHERTON MACDONALD.

REFERENCES CITED

The following references are of record in the file of this patent:

UNITED STATES PATENTS

| Number | Name | Date |
|---|---|---|
| 1,287,658 | Evans | Dec. 17, 1918 |
| 411,161 | Maynard | Sept. 17, 1889 |
| 292,281 | Brewster | Jan. 22, 1884 |
| 1,403,362 | Walters | Jan. 10, 1922 |
| 1,667,510 | Coe | Apr. 24, 1928 |
| 1,810,079 | Jennison | June 16, 1931 |
| 1,843,452 | Jennison | Feb. 2, 1932 |
| 2,048,811 | Peirce | July 28, 1936 |

FOREIGN PATENTS

| Number | Country | Date |
|---|---|---|
| 312,464 | British | May 30, 1929 |